United States Patent [19]

Feinbloom

[11] Patent Number: 4,799,793
[45] Date of Patent: Jan. 24, 1989

[54] METHOD AND APPARATUS OF PLACING A LENS IN A TELESCOPIC LENS ASSEMBLY WHILE PROVIDING OPTICAL ALIGNMENT

[75] Inventor: Richard E. Feinbloom, New York, N.Y.

[73] Assignee: Designs for Vision, Inc., Ronkonkoma, N.Y.

[21] Appl. No.: 906,985

[22] Filed: Sep. 15, 1986

[51] Int. Cl.[4] .............................................. G01B 9/00
[52] U.S. Cl. ..................................... 356/127; 350/252
[58] Field of Search ............... 356/124, 125, 126, 127; 350/252

[56] References Cited

U.S. PATENT DOCUMENTS

| | | | |
|---|---|---|---|
| 1,383,678 | 9/1920 | Tillyer et al. | 356/127 |
| 2,259,006 | 10/1939 | Simmons | 356/127 |
| 2,897,722 | 11/1953 | Gunter et al. | 356/126 |
| 3,542,476 | 11/1970 | Nord | 356/124 |
| 4,364,645 | 12/1982 | Feinbloom | 351/120 |
| 4,516,787 | 5/1985 | Venable | 269/287 |

Primary Examiner—F. L. Evans
Attorney, Agent, or Firm—Arthur L. Plevy

[57] ABSTRACT

There is disclosed a method and apparatus for providing spectacle correction on axis in a compound lens system. A lensometer having a lens stop assembly is used in conjunction with a collet fixture for positioning a lens and for aligning the lens in a compound lens system while employing the lensometer to enable optical alignment. The method operates by placing the lens in the fixture to firmly hold the lens and allowing the lens to protrude from the fixture. The fixture is then placed over the lens stop assembly of the lensometer and the compound lens system is then held against the lens as emplaced on the lens stop. By rotating the fixture, one can align the lenses on axis and determine the proper position of the lens in the compound system. The collet fixture which includes an inner tubular section having an open top and an open bottom. The tubular section is symmetrically disposed about an axis with the open top having a series of slots. The slots form a series of flanges and the slots extend over the surface of the inner member and intersect a threaded portion of the same. The outer peripheral edges of the flanges define a lens accommodating aperture. A rotatable ring which has an internal thread is then positioned over the threaded section of the tubular member and when rotated varies the spacing between slots thereby adjusting the effective diameter of the lens accommodating aperture to thereby hold the lens in a firm position while allowing a substantial portion of the lens to protrude to enable placement within a telescopic lens assembly while assuring optical alignment proper magnification of the total assembly.

7 Claims, 1 Drawing Sheet

U.S. Patent
Jan. 24, 1989
4,799,793
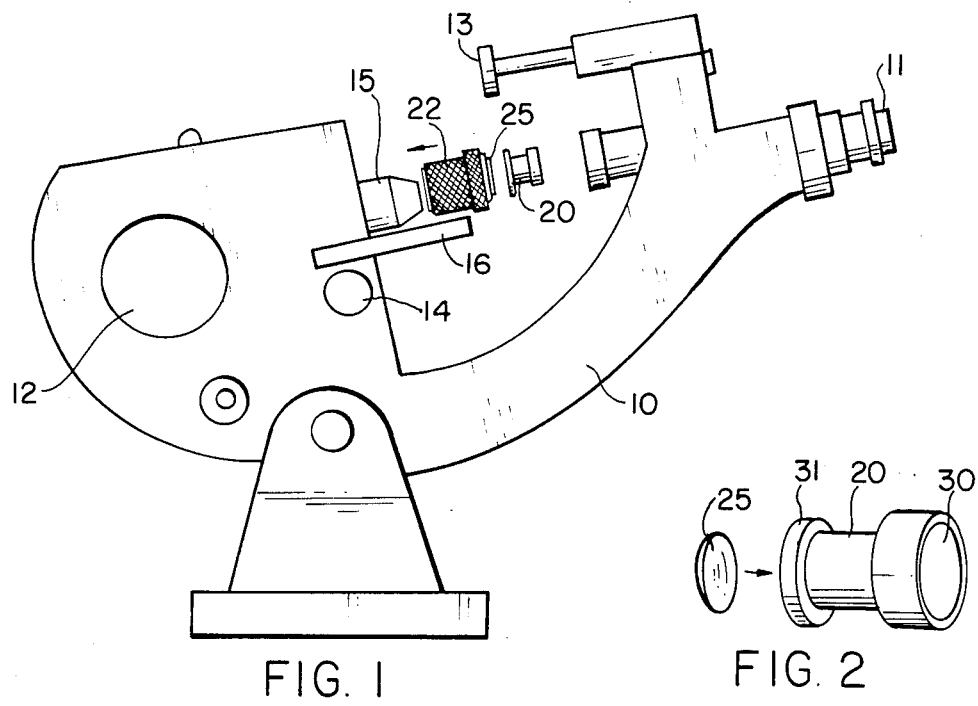
FIG. 1
FIG. 2
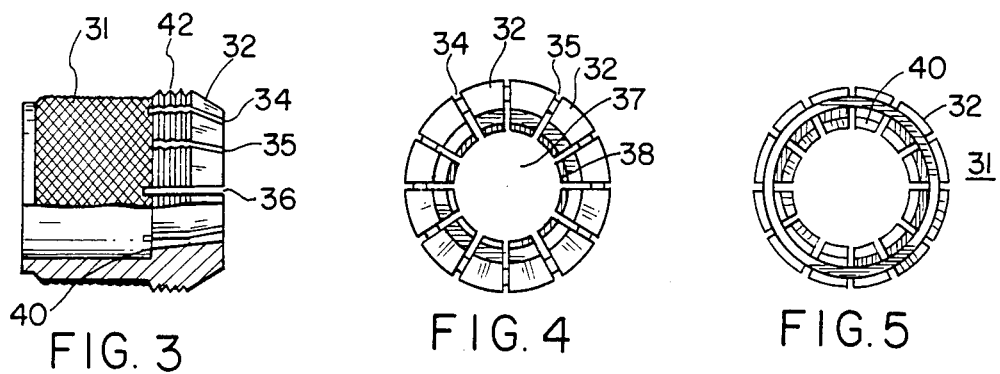
FIG. 3  FIG. 4  FIG. 5
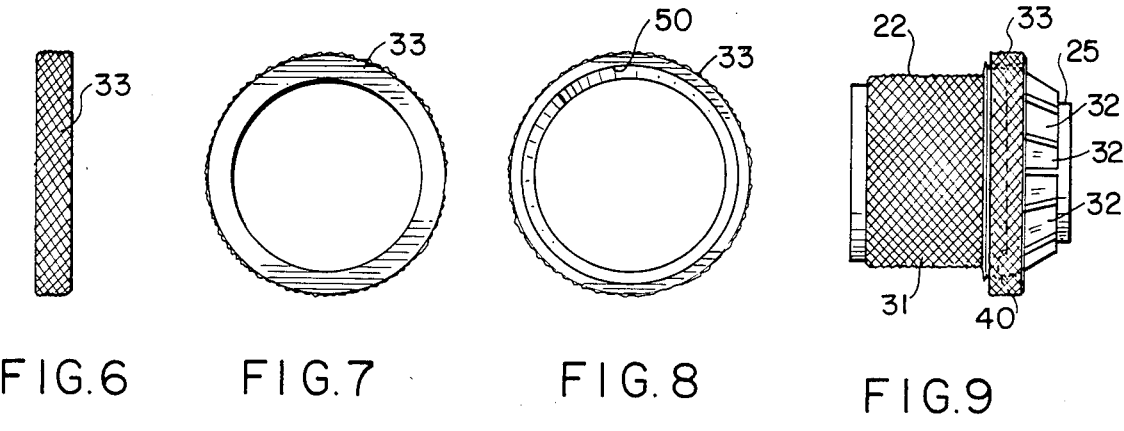
FIG. 6  FIG. 7  FIG. 8  FIG. 9

METHOD AND APPARATUS OF PLACING A LENS IN A TELESCOPIC LENS ASSEMBLY WHILE PROVIDING OPTICAL ALIGNMENT

BACKGROUND OF THE INVENTION

This invention relates to methods of assembling telescopic spectacles and more particularly to a collet lens holder which is used in conjunction with a lensometer to enable one to provide spectacle correction on axis for the telescopic spectacle assembly.

As one can ascertain, there are many individuals who are visually handicapped and who require the wearing of spectacles which have incorporated therein telescopic assemblies to enable these individuals to view distant objects. There are many causes of such visual handicaps and essentially the prior art is replete with a number of devices which enhance the vision of such individuals and enable these individuals to see in a reliable manner.

In any event, such devices, as for example telescopic assemblies, are prescribed for visually handicapped individuals by practitioners. The resultant devices, as one will understand, are manufactured or built according to the prescription required. The manufacture of such devices is an extremely time consuming operation. As one can ascertain, a telescopic device is a compound optical system and requires a plurality of lenses. In order to accommodate the prescription, these lenses are inserted in a typical telescopic housing assembly so that the proper prescription is provided as to the proper magnification and lens alignment with respect to the optical axis of the telescopic assembly.

The telescopic assemblies are conventionally inserted within a spectacle lens which is supported by a normal spectacle frame, and hence the entire assembly is worn by the visually handicapped user in order to enhance his vision. Such telescopic assemblies, as indicated, are available in magnifications of 3×, 4×, 5×, 6×, 7× and so on. In any event, one has to provide the proper telescopic assembly with a spectacle lens according to the patient's prescription. This spectacle lens has to be optically aligned with the telescope assembly. Thus, the optical axis of the spectacle lens must be aligned with the optical axis of the telescope assembly since any misalignment, by way of skewing of the spectacle lens or the like, would render the resulting assembly unusable. As one can ascertain, the telescopic assembly in regard to magnification would be a function of the extent of damage associated with the handicapped user. As indicated, the telescopic assemblies are carried by a spectacle frame which is associated with an eye glass frame and the distance from the telescopic assembly when the patient is accommodating the frame is about fifteen millimeters. Hence the line of sight through the telescopic assembly is extremely important and all this is compensated for in the laboratory based upon measurements made by the practitioner.

For an example of such a device, reference is made to U.S. Pat. No. 4,364,645 entitled Adjustable Frame Apparatus for Telescopic Assemblies issued to William Feinbloom on Dec. 21, 1982. That patent shows a trial frame assembly which is employed for determining interpupilary distances and the angle of inclination for persons having low or reduced vision and who require such telescopic assemblies. If reference is made to that patent, one can ascertain the problems and the general nature of telescopic assemblies.

As will be described, the fabrication of such assemblies in the laboratory or at the manufacturing facility is an extremely difficult task. One employs conventional instruments such as a lensometer to enable one to properly align the spectacle lens with the telescopic assembly before permanently affixing the lens with the telescopic housing assembly. The optical center of a spectacle lens in such applications always corresponds to its geometric center. However, in inserting a spectacle lens in a telescope assembly misalignment can easily occur if the spectacle lens is inserted off center and/or skewed with respect to the optical axis of the telescope assembly. The lensometer essentially is a device which measures the focal length of lenses as well as checking for optical alignment.

A suitable example of an extremely popular lensometer is an instrument manufactured by the Bausch and Lomb Company of Rochester, N.Y. which instrument is sold under the name Vertometer and has been widely employed in the optical field. This instrument is utilized during lens assembly procedures whereby a compound lens assembly having a fixed lens is provided with additional lenses using the Vertometer for alignment and measurement of the assembly.

In this manner the operator manually orientates the spectacle lens with respect to the telescope in order to obtain proper alignment. This is done while the telescopic lens assembly is held in position along the optical axis of the Vertometer. As one can ascertain, it is an extremely difficult procedure and once the operator checks optimum alignment, he then has to secure the spectacle lens to the telescopic assembly by means of a suitable epoxy or glue. This procedure can take a skilled operator a great deal of time due to the fact that the lenses being accommodated may be small and fragile and further due to the fact that the entire procedure has to be accommodated with the use of the Vertometer.

It is therefore an object of the present invention to provide a unique method enabling one to obtain spectacle correction on axis for a telescopic lens system.

It is a further object in providing a collet device which is essentially a lens holder which device is placed over the lens stop adapter in the Vertometer to enable the operator to thereby perform adjustment in a minimum amount of time while providing extremely reliable results.

BRIEF DESCRIPTION OF THE PREFERRED EMBODIMENT

A method of providing spectacle correction on optical axis in a compound lens system by employing a lensometer having a lens stop assembly for positioning a lens on which measurements are to be made for aligning the lens in said compound lens system while employing said lensometer, comprising the steps of placing said lens in a fixture to firmly hold the lens while allowing said lens to protrude from said fixture, placing said fixture and lens over said lens stop assembly of said lensometer, moving said compound lens system with respect to said lens to align the same along said axis to determine the proper orientation of said lens within said compound systems.

BRIEF DESCRIPTION OF THE FIGURES

FIG. 1 is a side elevational plan view of a Vertometer utilizing a collet holder for a spectacle lens according to this invention.

FIG. 2 is a schematic view depicting a telescopic spectacle lens assembly which is the type of device to be aligned according to this method.

FIG. 3 is a side elevational view showing a tubular inner section member of a collet assembly.

FIG. 4 is a front view of the device of FIG. 3.

FIG. 5 is a rear view of the device of FIG. 3.

FIG. 6 is a side view of the ring assembly utilized with the collet member according to this invention.

FIG. 7 is a front view of the ring assembly.

FIG. 8 is a rear view of the ring assembly.

FIG. 9 shows an assembled view of a lens holder assembly according to this invention.

DETAILED DESCRIPTION OF THE FIGURES

Before proceeding to describe this particular invention and the advantages thereof, it is indicated that telescopes usually include an objective lens which is directed towards the object to be observed and an ocular lens through which the observer views. Normally the rays coming from the distant object are almost parallel and they converge to form an image at the focus of the objective lens. This point also coincides with the focus of the ocular so that the rays emerging from the ocular lens are again parallel. The observer just sees the object as though it were at infinity but at a larger angle than without the aid of a telescope. Magnification in such telescopes is normally defined as the ratio of the focal length of the objective to that of the ocular.

These optical constraints on telescopes are well known. As indicated above, telescopic assemblies are utilized in conjunction with spectacles and are carried by spectacle frames to enable severely handicapped persons to view distant objects. Such devices are also used by surgeons in performing critical operations as in microsurgery and so on. A practitioner makes extensive measurements in order to properly define the telescope assembly as well as the spectacle lens for his patient, including the magnification which is suitable for that particular patient. These specifications are then sent into a laboratory where a spectacle lens and telescopic assembly is fabricated. As indicated above, prior art techniques of fabricating such assemblies are extremely time consuming due to the fact that the operator has to manipulate the lenses using a Vertometer or a lensometer in order to assure proper alignment.

Referring to FIG. 1, there is shown a side view of a typical lensometer which as indicated is a device which measures the focal length of a lens. Such a device is manufactured by the Bausch and Lomb Company of Rochester, New York and sold as the Model 70 Vertometer. The full description of the device is also afforded by a catalog produced and distributed by the above-noted company under Catalog No. 21-65-70. Such devices are extremely important in handling lenses from the manufacture to the final inspection of the lens and especially lenses utilized in eye glasses or in telescopic aids, as indicated above.

This device will measure the spherical, cylindrical and prism powers of a lens. The device will also locate the axis of the lens as well as various other things.

In FIG. 1 there is shown a side view of a typical Vertometer. Essentially, the Vertometer 10 is a centered optical system which consists of a light source normally built into the device, a movable, rotatable target, a standard lens, a telescope and a holder for holding the spectacle lens at the standard lens interior principal focus. The device includes means for rotating and shifting the target position and a mechanical coaxial marking device.

Hence with a spectacle lens centered in position for measuring, the target is positioned to be imaged by the standard lens at the focus of the spectacle lens. In this position the target is imaged on the telescope recticle by the spectacle lens and is viewed conventionally through the eye piece.

Shown in FIG. 1, the device consists of an eye piece 11 and employs a control 12 which serves to rotate the cylinder axis drum, includes a lens holder 13, a lens table control 14 which is associated with a lens table 16. Briefly speaking, the eye piece 11 forms part of a telescope. The telescope also contains the recticle lens and the objective lens. Rotating the eye piece 11 allows one to focus the device for the individual visual requirements of the user. The device includes various scales to enable further adjustment.

When the eye piece 11 is in focus, there are scales which mark alignment with fiducial marks. These all enable one to obtain correct focus. Also shown is a lens stop designated by reference numeral 15. In the normal use of such a device, the concave or back surface of a lens assembly is placed against the lens stop 15. If the lens is edged, one must be sure that the center point of the lens is in the center of the lens stop 15. Once this is set up, one can then rotate the power drum and the cylinder axis scale simultaneously until the target image is seen through the eye piece. Once the image is sharply defined, one will see an intersection regarding various lines which enables one to therefore be assured that the focussing and alignment of the lens is proper. One can then determine both the lens center as well as marking the lens center as well as performing complete analysis of the lens. The lens stop 15, as shown, is a conical member X and holds the spectacle lens at the anterior principle focus of the standard lens. Normally, the focal length of the standard lens is short and hence small variations in the position of the lens stop 15 can make for large differences in the power reading.

Also shown in FIG. 1 is a telescopic assembly of the type described above to be utilized for mounting in a spectacle system for use by a visually handicapped or other person. The telescopic assembly 20 is a compound device consisting of an objective lens and an ocular lens. A spectacle lens 25 which has a corresponding geometric and optical center is normally inserted into the telescopic assembly by an operator, and in doing so, the operator must make sure that the spectacle lens is in axial alignment with the telescope axis and that it is placed in proper position. The spectacle lens may not be skewed. The spectacle lens is necessary to accommodate the patient's prescription as regarding his spectacles.

As indicated, the prior art techniques utilized manual manipulation which was a very time consuming process and depended greatly on the skill of the operator to manipulate the telescope assembly and the sepctacle lens with respect to the lens stop mechanism 15 in order to determine the axial alignment of the system. Shown in FIG. 1 is a collet or a lens holder assembly 22. As will be explained, the lens holder assembly 22 is adapted to hold the spectacle lens 25 center while the collet member 22 is adapted to slide over the lens stop 15. In this manner the lens 25 held by the assembly 21 is then automatically centered at the lens stop 15 associated with the Vertometer, while the lens protrudes from the collet assembly 22.

The operator can now place the telescope assembly 20 against the lens 25 due to the fact that the lens 25 protrudes from the front surface of the collet device. In this manner when the collet device 22 is emplaced over the lens stop 15, the lens 25 is held in exact optical alignment with respect to the lens stop 15. The operator then holds the telescope assembly 20 against the lens 25 and orientates the collet by rotation or the like with the protruding lens until optical alignment and lens centering is verified through the eye piece 11 of the Vertometer 10. In this manner the operator can exactly adjust the position of the spectacle lens and secure the lens in exact alignment without the necessity of manipulating both the lens and the telescope at the same time. It has been found that utilizing the collet device according to this invention saves a great deal of time and effort.

Hence according to this invention, the spectacle lens is secured in the collet device and then set into the telescopic assembly with a minimum of effort. The collet device 22 which as inserted over the lens stop 15 is fabricated so that it is in exact alignment with the lens stop device 15 and furthermore can be rotated with respect to the lens stop 15 as desired.

Referring to FIG. 2, there is shown a typical telescopic lens assembly 20 which is of the type which may be inserted into a spectacle frame for a visually handicapped user. As indicated, the telescopic lens assembly contains an outer housing which houses an objective lens 30 mounted at the front portion and an ocular lens. Shown adjacent and to the left of the telescopic housing is a spectacle lens 25. Basically, the lens 25 is of a relatively small diameter and is adapted to be inserted into the hollow tubular telescopic assembly at the end shown and in the direction of the arrow. As indicated, the lens 25 must be inserted within the telescopic assembly housing 20 in proper axial alignment.

In order to accomplish this as indicated in regard to FIG. 1, the spectacle lens assembly 25 is secured within the collet assembly 22 which holds the lens and allows the lens to protrude so that the operator can now hold the telescopic housing 20 against the lens 25 while manipulating the collet to determine the proper optical alignment with the Vertometer.

Referring to FIG. 9, there is shown the collet device 22 holding a spectacle lens 25. As one can see, the lens 25 protrudes from the front of the collet device 22 to allow emplacement within the telescope housing. The collet device 22 consists of an inner hollow tubular member assembly 31 having a series of projecting peripheral flanges separated by slots and which slots are adjusted by means of a rotatable ring 33 to enable an operator to insert a lens within the aperture associated with the tubular member 31. The flanges 32 depend from the periphery of the tubular member 31 and are separated by a plurality of slots, one for each flange, which slots are contiguous with a threaded portion of the member 31. The rotatable or adjustable ring 33 has an internal thread which coacts with the outer thread on the tubular member 31. As the ring 33 is rotated about the screw thread, the spacing between the slots which separate the flange-like members 32 is varied to thereby hold the spectacle lens 25 about its periphery while assuring that the central axis of the lens is centered within the collet 22. The front end of the lens 25 as shown in FIG. 9 protrudes at a distance great enough to allow for all normal accommodations by the telescopic housing assembly 20.

Hence by using the collet device, one can be sure that the lens 25 is centered and held in proper positions while further assuring that lens protrudes at a great enough distance outwardly to enable it to be positioned within the telescopic assembly or housing 20 once aligned. This therefore enables an operator to assure proper lens alignment with regard to the optical axis of the telescopic assembly. It further allows the operator to perform the various test procedures afforded by the use of the Vertometer 10.

Referring to FIG. 3, there is shown a side sectional view of the inner tubular assembly 31. Essentially, the assembly 31 consists of an outer cylindrical portion 40 which cylindrical portion is hollow and is accurately machined so that it fits over the lens stop 15 of the Vertometer. The inner tubular member is associated with an integral peripheral threaded section 42 which threaded section 42 accommodates the rotatable ring 33. A series of peripheral slots or grooves 34, 35, and 36 are directed from the outer edge of the tubular member 31 and pass through the threaded portion 42 in the manner shown. As seen, the front end of the tubular member 31 is tapered with respect to the back end 41.

FIG. 4 shows a front view of the assembly 31. As seen, the slots 34 and 35 are directed radially and form between each pair of slots a flange member as 32. In a typical device there are 12 flanges each of which are separated by suitable slots as 34 and 35. Also seen in FIG. 4 there is an outer peripheral indentation or ridge 38 which is formed and machined at the outer periphery of each of the flange members 32. This forms a recess which is capable of accommodating the lens within the lens accommodating aperture 37. Essentially, the outer periphery of the lens abuts against the walls formed by the ridges 38 which are machined into each of the flange members 32.

Referring to FIG. 5, there is shown a bottom view of the assembly 31. As one can see, it is a hollow member and also has an inner flange 40 which flange abuts directly against the lens stop 15 of the Vertometer 10. This inner flange 40 is adjacent the back end of the lens, and by placing the entire tubular member 31 over the lens stop, one is assured that the lens accommodated by the collet assembly 22 is in optical alignment with the lens stop member 15.

FIG. 6 shows a side view of the ring member 33, while FIG. 7 shows a front view of the ring member and FIG. 8 shows a rear view. As one can see from FIG. 8, the inside periphery of the ring member is threaded, and the threaded portion is adapted to coact with the threaded portion 42 on the tubular member 31. As the ring 33 is rotated with respect to the tubular member 31, the spacing between the flanges can be adjusted to thereby enable the secure holding of a lens while centering the lens due to the fact that the lens also sits in the peripheral flange 38. The back surface of the lens abuts against the surface 40 as shown in FIG. 9 by the dashed line therefore assuring that the center of the lens is in optical alignment when the collet member 22 is emplaced over the lens stop 15. Thus the apparatus and method enables one to manipulate a telescopic assembly while aligning spectacle lens within the telescopic assembly and using a Vertometer or similar device at the same time to achieve axial alignment.

What is claimed is:

1. A method of providing spectacle correction on optical axis in a compound lens system by employing a lensometer having a lens stop assembly for positioning a lens on which measurements are to be made for aligning the lens in said compound lens system while employing said lensometer, comprising the seps of:
   (a) placing said lens in a fixture to firmly hold the lens while allowing said lens to protrude from said fixture,
   (b) placing said fixture and lens over said lens stop assembly of said lensometer,
   (c) moving said compound lens system with respect to said lens to align the same along said axis to determine the proper position of said lens within said compound systems.

2. The method according to claim 1, wherein said compound lens system is a telescopic system, which system includes an objective and an ocular lens mounted in a housing with said lens being a spectacle lens for said telescopic assembly.

3. The method according to claim 1, wherein said fixture comprises a collet assembly including a first tubular section having a front end including a plurality of extending flanges each separated by a slot and forming a lens accommodating aperture with a top threaded portion surrounded by a threaded rotatable ring which when rotated adjusts the spacing of said slots to grip said lens within said aperture while allowing said lens to protrude from said front end.

4. A method of providing lens correction for a telescopic lens assembly wherein said lens assembly includes an objective lens retained in a cylindrical tubular housing at one end and an ocular lens at another end for receiving a spectacle lens which is to be positioned in said housing in optical alignment with said telescope by using a lensometer to perform said optical alignment, comprising the steps of:
   (a) placing said spectacle lens in an apertured fixture to firmly hold said spectacle lens about the periphery thereof and to allow said lens to protrude from said aperture so that a portion of said lens protrudes from said fixture,
   (b) positioning said held lens and fixture over the lens stop assembly of said lensometer to hold said spectacle lens at said lens stop,
   (c) placing said telescopic lens assembly about said extending lens portion while rotating said fixture until there is alignment about the optical axis to determine the correct optical position of said spectacle lens with respect to said telescopic assembly.

5. The method according to claim 4, wherein said fixture comprises a collet assembly including a first tubular section having an opened top and bottom end, with said top end containing a plurality of extending flange members defining a lens accommodating aperture with each of said flange members separated from an adjacent one by a slot, said first tubular section having an outer threaded portion into which said slots extend, a second circular ring member surrounding said threaded portion and rotatably adjustable to vary the space between said slots to thereby vary the diameter of said lens accommodating aperture to allow said spectacle lens to be firmly held about the periphery thereof and to cause said lens to extend from said top end with said bottom end adapted to be placed over said lens stop assembly of said lensometer.

6. A collet assembly apparatus for holding a lens for assembly purposes, comprising:
   a first tubular member section symmetrically disposed about an axis and having an opened top and bottom end, said member having an intermediate threaded peripheral section, with a series of surface slots directed from said opened top end and intersecting said threaded section to form a plurality of flanges between said slots with the outer ends of said flanges defining a spectacle lens accommodating aperture, a rotatably adjustable ring positioned over said threaded section and having a corresponding internal thread to allow said ring when adjusted to vary the spacing of said slots to thereby vary the diameter of said lens accommodating aperture to enable a spectacle lens emplaced within said aperture to be firmly grasped about the periphery thereof while allowing a predetermined portion of the lens to extend from said aperture.

7. The collet assembly apparatus according to claim 6, wherein each end of said flange as located about the periphery of said accommodating aperture is depressed to thereby form a depressed peripheral flange about said aperture into which the peripheral edge of said lens is positioned, said tubular member having an inner reference flange located therein at a given distance from said peripheral flange to serve as a reference point enabling said collet member to be placed over a reference projection with said inner flange serving to position said lens when accommodated at a given distance from said reference projection wherein said reference projection is a lens stop assembly associated with a lensometer.

* * * * *